Nov. 8, 1960
H. A. WHELTLE
2,959,303
LADING TRANSFER SYSTEM
Filed July 9, 1959
9 Sheets-Sheet 1
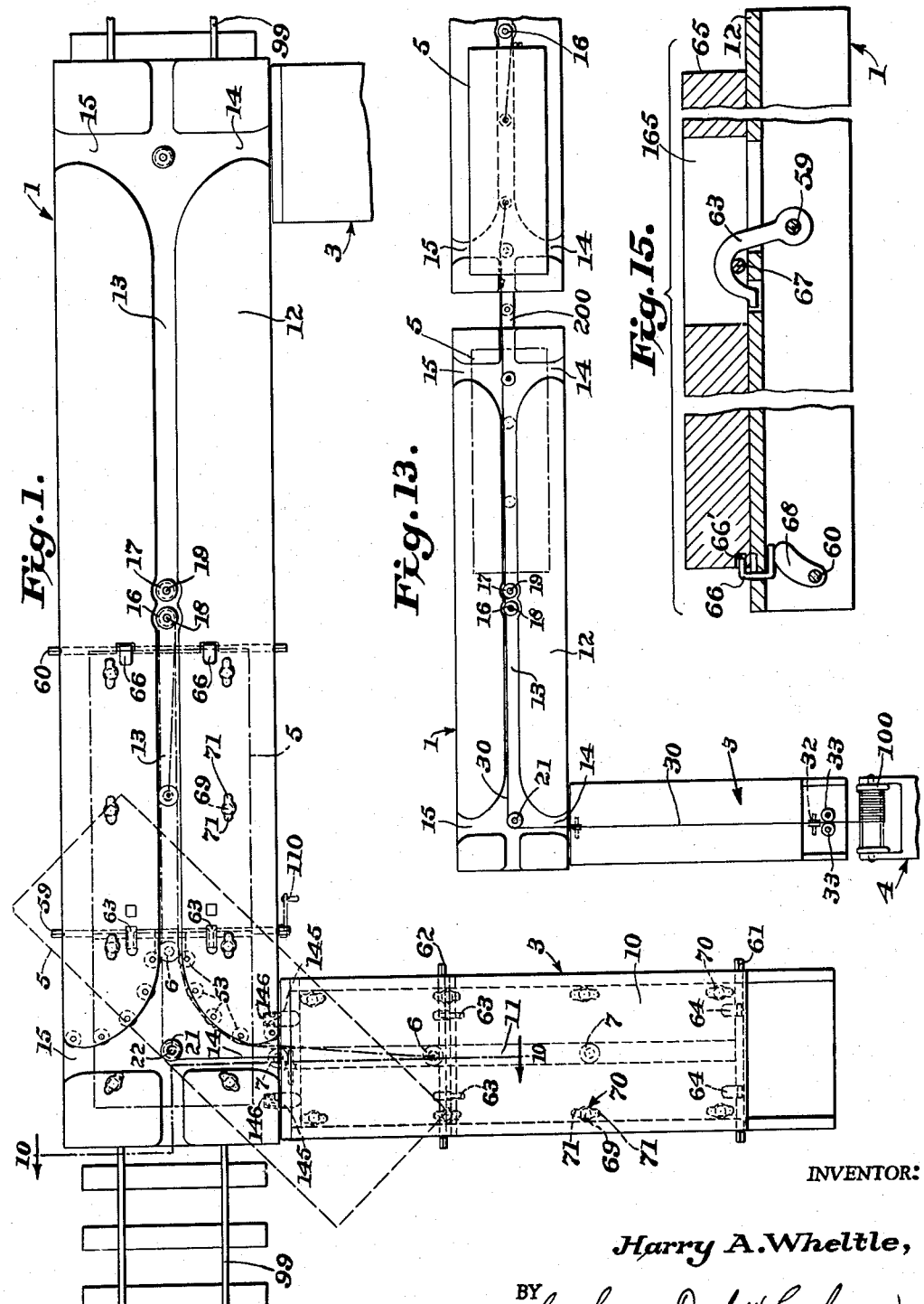
INVENTOR:
Harry A. Wheltle,
BY Cushman, Darby & Cushman
ATTORNEYS.

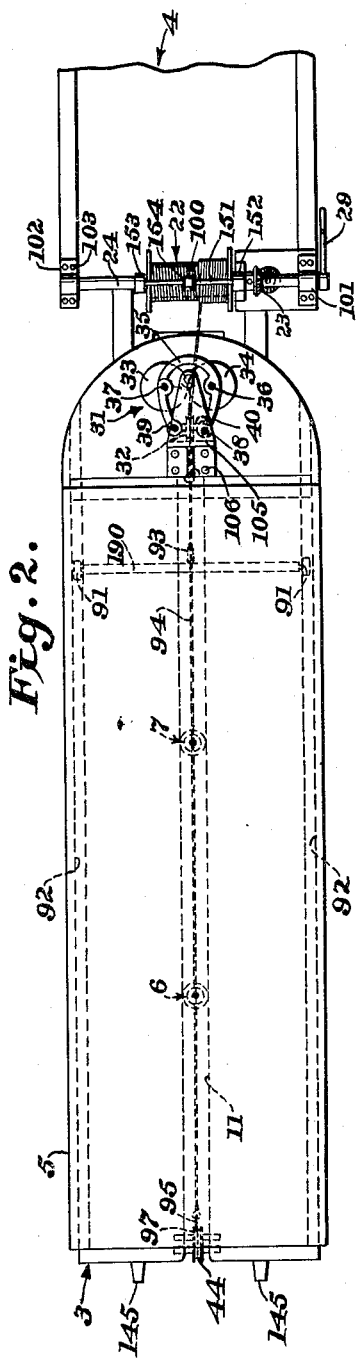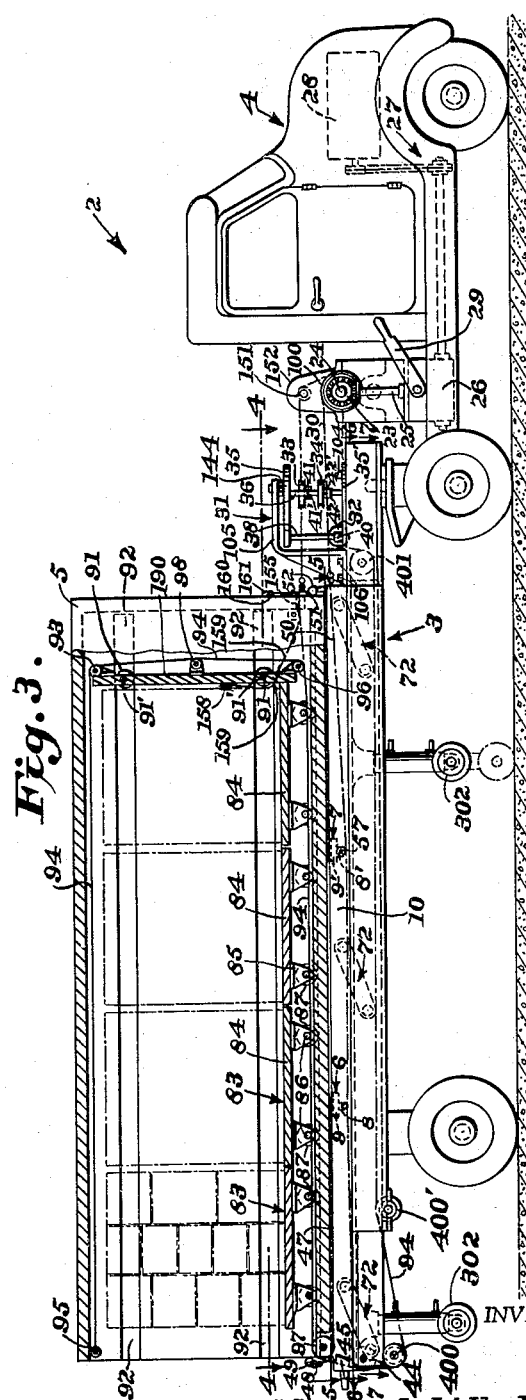

Nov. 8, 1960     H. A. WHELTLE     2,959,303
LADING TRANSFER SYSTEM
Filed July 9, 1959     9 Sheets-Sheet 3
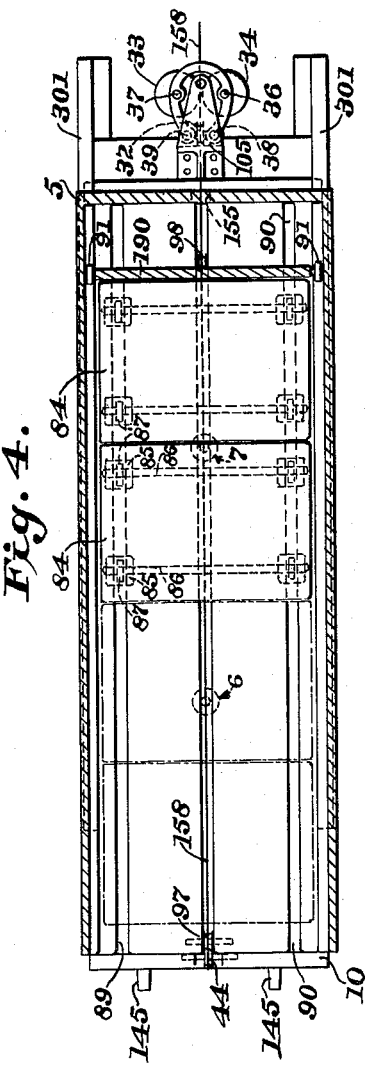
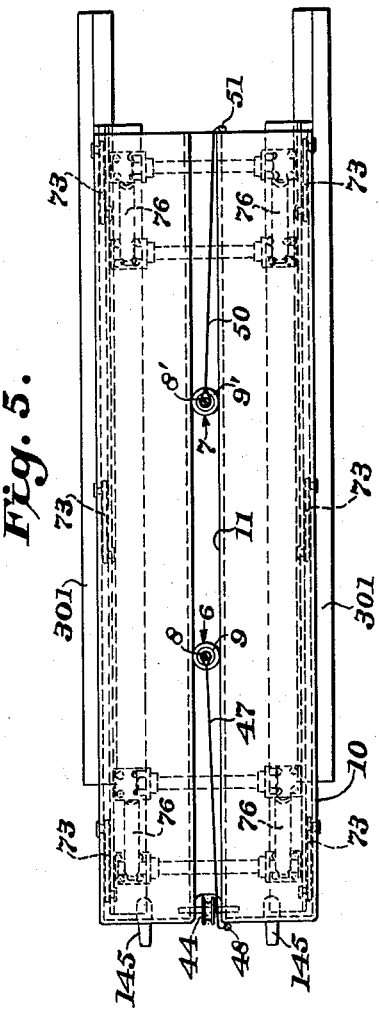
INVENTOR:
Harry A. Wheltle,
BY Cushman, Darby & Cushman
ATTORNEYS

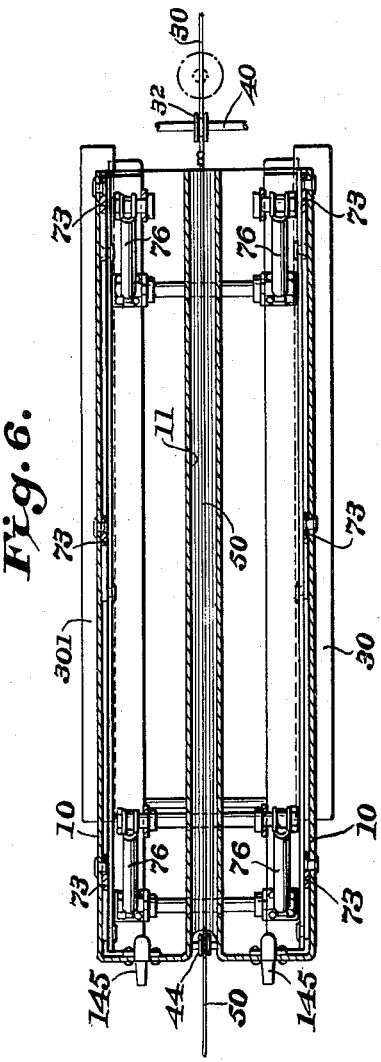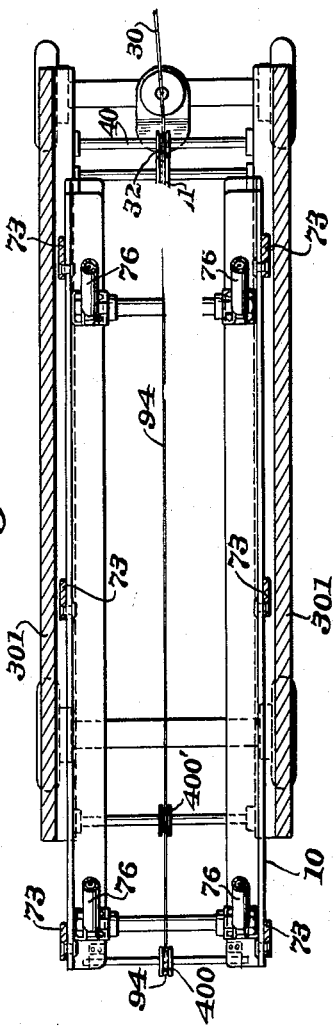

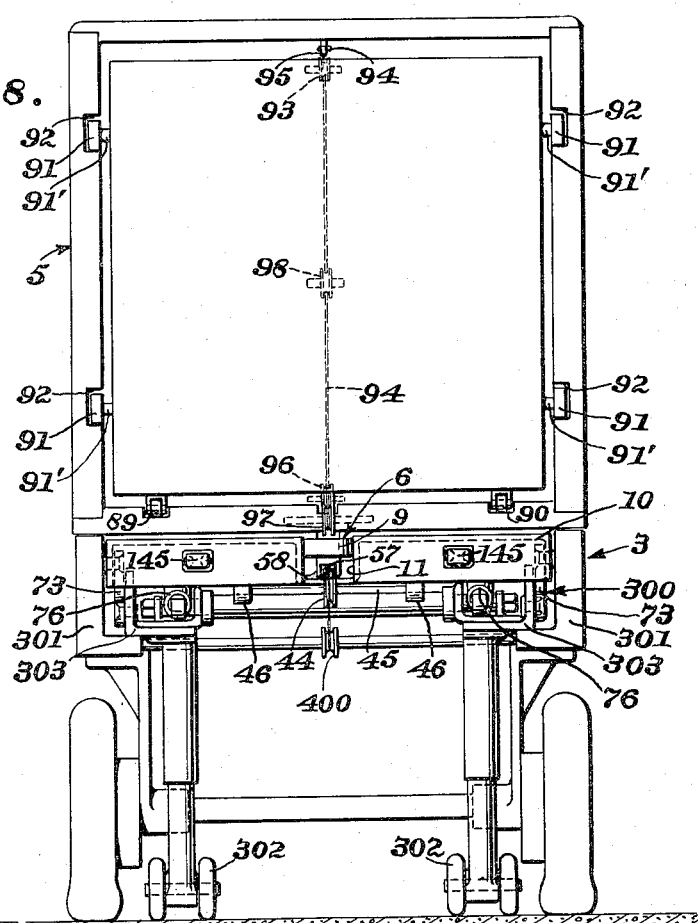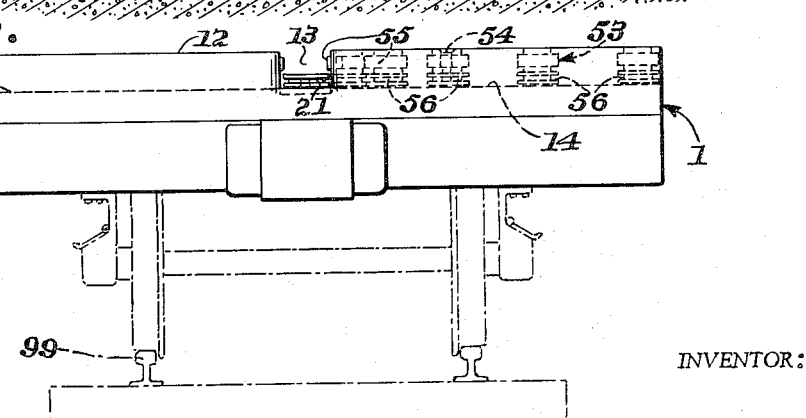

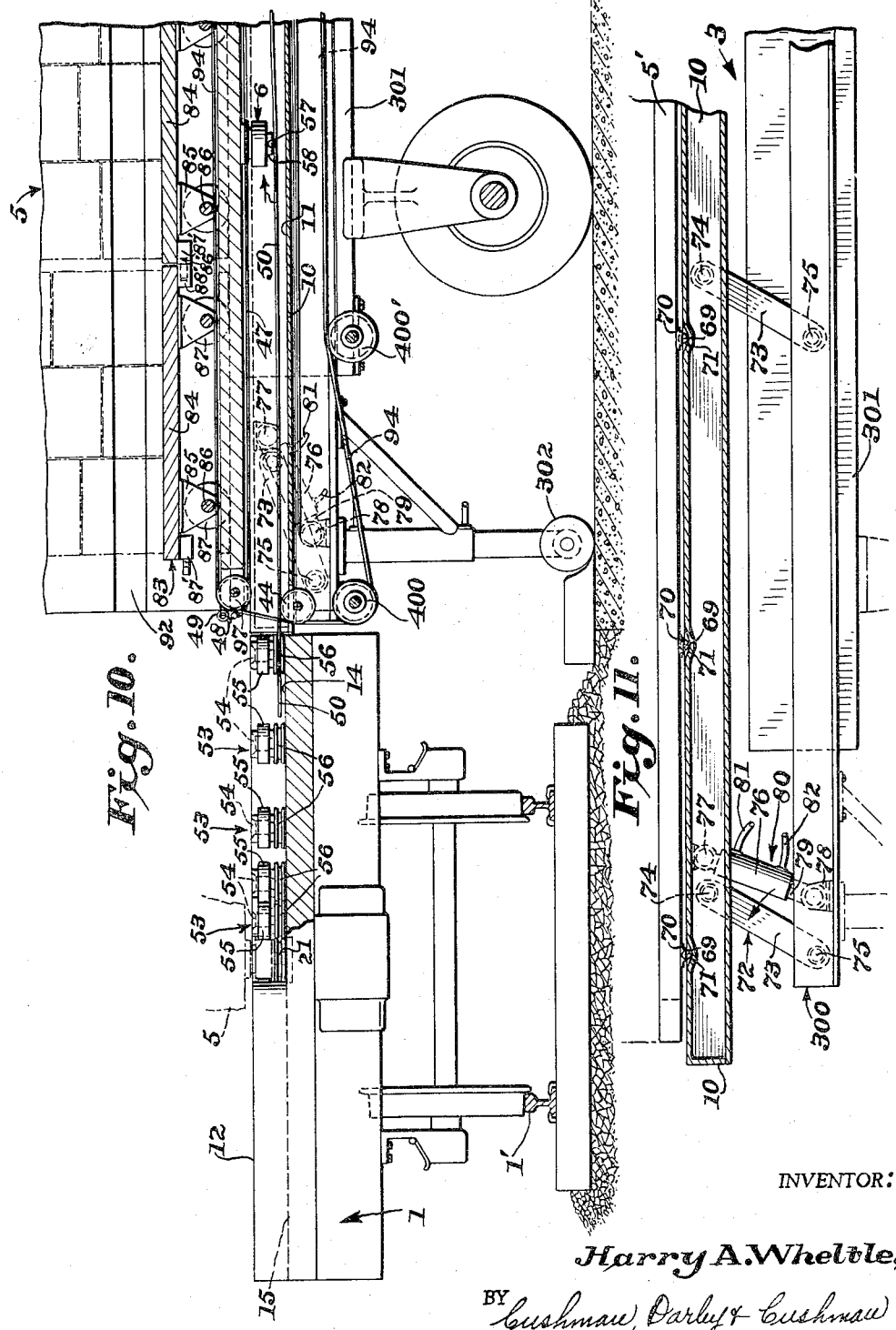

Nov. 8, 1960 H. A. WHELTLE 2,959,303
LADING TRANSFER SYSTEM
Filed July 9, 1959 9 Sheets-Sheet 7
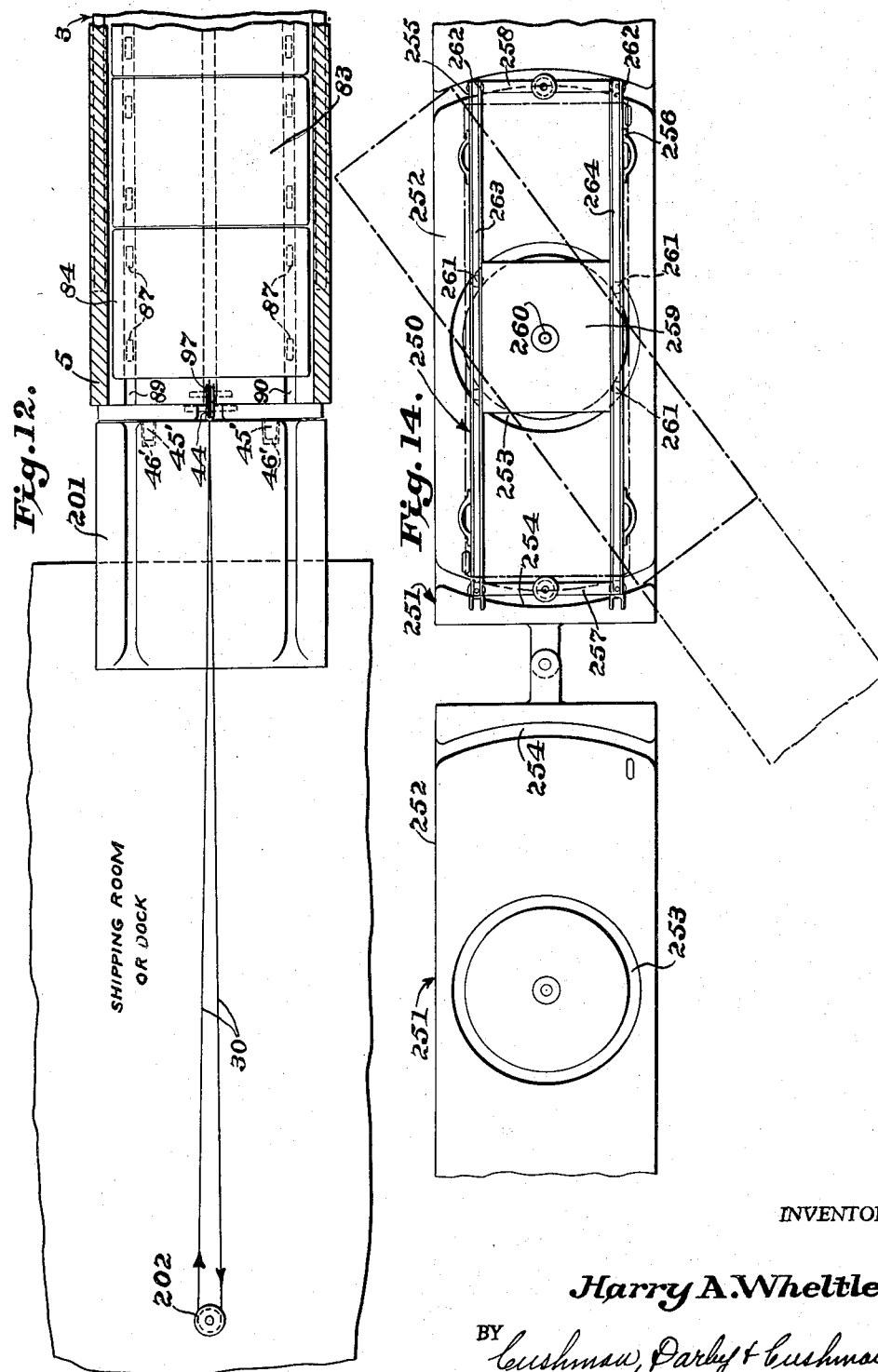
INVENTOR:
Harry A. Wheltle,
BY Cushman, Darby & Cushman
ATTORNEYS.

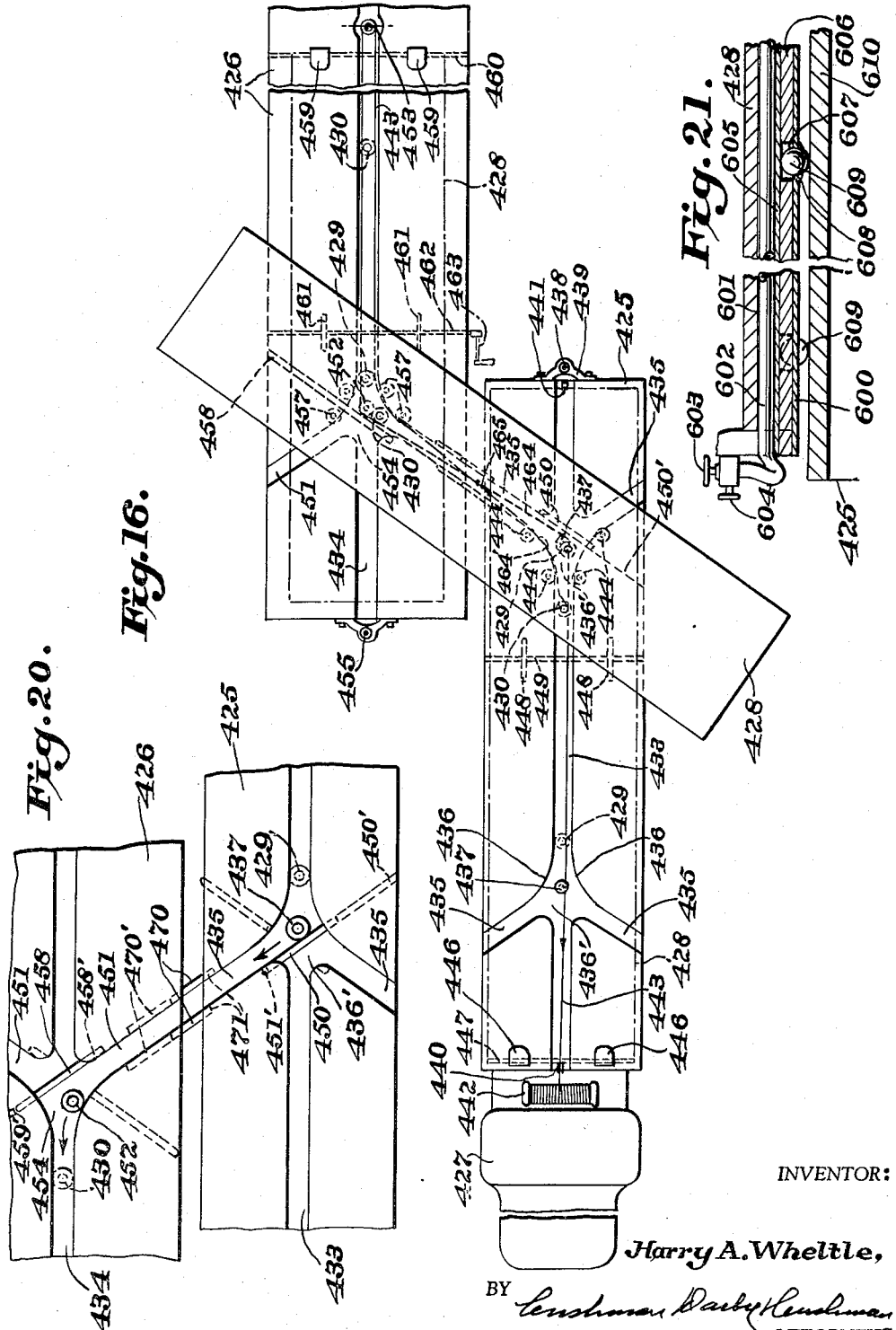

Nov. 8, 1960     H. A. WHELTLE     2,959,303
LADING TRANSFER SYSTEM
Filed July 9, 1959     9 Sheets-Sheet 9
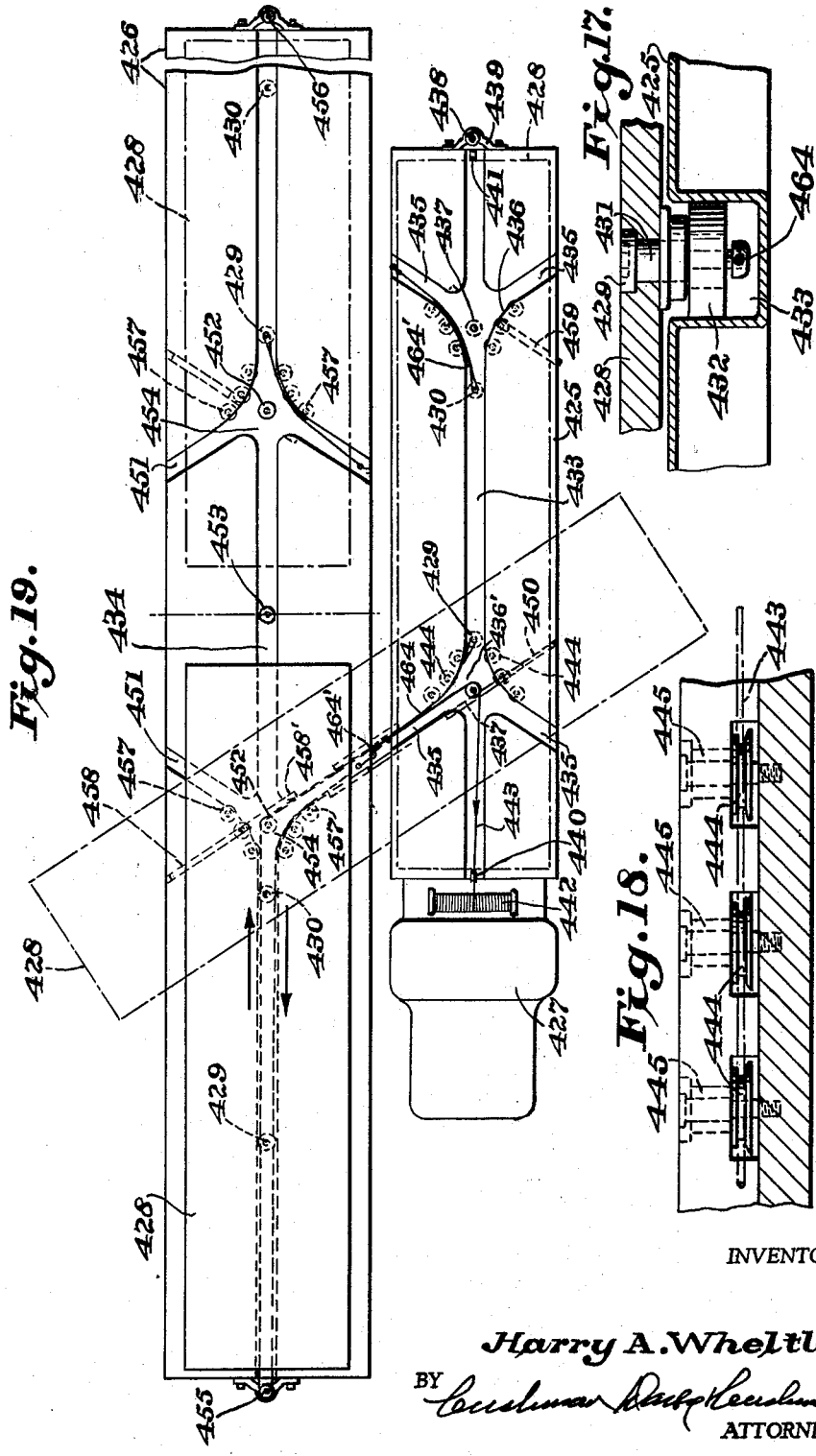
INVENTOR:
Harry A. Wheltle,
BY
ATTORNEYS

United States Patent Office 2,959,303
Patented Nov. 8, 1960

2,959,303

LADING TRANSFER SYSTEM

Harry A. Wheltle, 3417 Ravenwood Ave., Baltimore 13, Md.

Filed July 9, 1959, Ser. No. 825,930

16 Claims. (Cl. 214—38)

This invention relates to an improved system for handling and transporting freight and has particular reference to systems wherein the commodities or articles undergoing transportation are received within mobile transporting containers which are adapted to be transported both upon roadway vehicles and railway vehicles. The present application is a continuation-in-part of my copending application Serial No. 699,972, filed December 2, 1957, and now abandoned.

An object of the present invention resides in the provision of means for transferring such containers, or like objects from a railroad car to a highway truck, from the truck to the car, from car to car, from truck to truck, from truck to a loading platform, from platform to truck, car to platform, or platform to car more quickly safely and economically than can be accomplished with prior systems.

A further object of this invention is to provide means for transferring the mobile transportation containers that allows for transferring the containers from roadway vehicle to railway vehicle while the two are in perpendicular juxtaposition.

A further and more specific object of this invention is to provide apparatus for transporting articles in an elongated mobile transportation container, which apparatus provides for movement of the container laterally and longitudinally of the vehicle from which it is being transferred during a transfer from one vehicle to another.

It is a further object of this invention to provide apparatus for transporting articles in a mobile container which apparatus includes a roadway vehicle or mobile container base having a vertically adjustable supporting frame for supporting the container, a railway vehicle, another mobile container base, which cooperates with the roadway vehicle when it is desired to transfer the container from one vehicle to the other, cooperating guide means disposed on the vehicles for guiding a turning transfer of the container from one vehicle to the other, and a power source used both to power the roadway vehicle and to power the container during a transfer.

It is yet a further object of this invention to provide an apparatus of the above described type wherein the means for guiding movement of the container are in the form of single main guide channels in the container supporting surfaces of the base, the main channel in one surface joining a transverse channel in that surface, thus allowing for a transfer of the container when the container supporting surfaces are in substantially perpendicular juxtaposition.

Still a further object of this invention is to provide, in combination with apparatus of the above described type, a mobile transportation container adapted to house dollies movable therein, and having therein a bulkhead for removing the dollies therefrom.

A still further object of this invention is to provide apparatus for transporting articles, as set forth hereinabove, that includes cable means operable from a single winch for imparting movement to the container during a transfer, and to the dollies contained therein and the bulkhead movable therethrough during a loading or unloading of the container.

Another object of this invention is to provide an apparatus for transporting articles in accordance with the above objects, which apparatus provides for the simultaneous loading or unloading, or both, of more than one mobile transportation container to or from, respectively, a railway vehicle.

Yet another object of this invention is to provide a railway vehicle with a guideway and turntable means thereon, which turntable means has rotatable supporting elements depending therefrom to cooperate with the guideway.

Still further objects of this invention are the provision of a transportation container in which the load is stored and transported with a minimum of effort upon the part of the user, the provision of means for anchoring a mobile transportation container in place on a transportation vehicle during movement of the vehicle, the provision of means for properly guiding a power cable, regardless of position of tractor relative to associated trailer, when a transfer of a mobile transportation container from vehicle to vehicle is in progress, the provision of means for connecting guideways between two adjacent railway vehicles together to allow for transfer of a container from one vehicle to the other, the provision of means to connect two dollies together so that they are movable within a transportation container in unison, and the provision of guideways within the transportation container to guide movement of dollies within the container.

Still other objects of this invention will become apparent to those of ordinary skill in the art by reference to the following detailed description of the exemplary embodiments of the apparatus. The various features of the exemplary embodiments according to the invention may be best understood with reference to the accompanying drawings, wherein Space around railroad loading areas is often restricted and at a premium so that right angle loading or unloading is practically prohibited in such areas. Accordingly, a further object is to provide an apparatus for transporting articles and transferring the articles from one vehicle, such as a highway trailer, to another vehicle, such as a railway flat car, while both vehicles are arranged side by side and substantially parallel to each other, and from either side or opposite sides simultaneously. Thus simple, efficient, and compact means are provided for loading or unloading the vehicles when a flat car and the rear of a highway trailer are approximately arranged end to end for loading at either end of the flat car at a minimum expenditure of time, labor and cost. The flat car provides six points where loading or unloading may take place, while the highway trailer has five points where such loading or unloading may be accomplished.

Other objectives and advantages of the invention will become apparent when taken in conjunction with the accompanying claims and drawings.

Figure 1 is a plan view of the apparatus of this invention showing the various parts thereof in position occupied during the transfer of a mobile transportation container from a roadway to a railway vehicle.

Figure 2 is a plan view of parts of a tractor-trailer roadway vehicle constructed in accordance with this invention.

Figure 3 is a side view showing a tractor-trailer roadway vehicle carrying a transportation container, the vehicle and container being constructed in accordance with this invention.

Figure 4 is a plan view of the apparatus shown in Figure 3 taken along line 4—4.

Figure 5 is again a plan view of the apparatus shown in Figure 3 but taken along the line 5—5.

Figure 6 is also a plan view of the apparatus shown in Figure 3, but taken along the line 6—6.

Figure 7 is another plan view of the apparatus shown in Figure 3 but taken along the line 7—7.

Figure 8 is an end view of the vehicle and container disposed thereon shown in Figure 3.

Figure 9 is an end view of a railway vehicle shown in Figure 1.

Figure 10 is a sectional view taken along line 10—10 of Figure 1.

Figure 11 is a side view partially in section showing details of construction of a vertically adjustable frame for a roadway vehicle as provided by this invention.

Figure 12 is a plan view of a roadway vehicle carrying a container housing dollies, the figure showing the position of the components of the apparatus when the dollies are ready to be unloaded on a shipping platform in accordance with this invention.

Figure 13 is a plan view of a roadway vehicle and railway vehicles showing the position of components of the apparatus of this invention in position for a transfer of a mobile container from one railway vehicle to another.

Figure 14 is a plan view showing the various components of a turntable arrangement provided on a railway vehicle in accordance with a modification of this invention.

Figure 15 presents details of construction of means for securing a mobile transportation container in position on a container base.

Figure 16 is a plan view of a further modified form of the invention showing the flat car and rear of a highway trailer arranged approximately end to end.

Figure 17 is a detail sectional view of the roller connection of the container in Figure 16 with a channel member.

Figure 18 is a longitudinal detail sectional view of the guide pulleys in Figure 16 positioned adjacent the sides of the channels.

Figure 19 is a plan view similar to Figure 16 but showing the vehicles arranged side by side for loading or unloading the same on one side of the transverse center line of the flat car.

Figure 20 is a detail plan view showing the location and construction of the horizontal guide bars and their associated parts and with certain of the pulleys ommitted; and Figure 21 is a longitudinal sectional detail view of a modified form of ball bearing means for reducing friction between the container and the floor of a vehicle.

In Figure 1, the numeral 1 generally designates a railway vehicle, shown as a flat railroad car. The numeral 3 designates the trailer of a roadway vehicle comprising a tractor-trailer combination 2 such as that shown in Figure 3. The numeral 5 designates a mobile transportation container which houses articles to be transported. The numeral 99 designates a railroad track upon which railway vehicle 1 travels, and perpendicular to which is positioned the trailer of roadway vehicle 2. As shown in Figure 3, two guide members 6 and 7 depend from the bottom of container 5. The guide members, as will be seen by reference to Figure 2, are disposed along an imaginary line running centrally and longitudinally of the container 5 but are disposed on opposite sides of an imaginary line running centrally and transversely of the container 5. The guide members, as shown, comprise vertically disposed spaced shafts 8 and 8' upon which are rotatably mounted wheels 9, 9'. The shafts 8, 8' are attached to the bottom of the container by any suitable means. The shafts may be welded to the base of the container, they may fit within and connect with a housing attached to the bottom of the container, they may extend through a suitably formed aperture in the base of the container and carry securing collars at either end of the aperture, or they may be attached to the container by any other suitable means. The means by which the guide members are attached to the container forms no part of the present invention; it is only necessary that guide members secured in some manner depend from the bottom of the container in positions as above set forth.

In Figure 8 wherein the rear of the trailer 3 is shown, it will be seen that trailer 3 carries a container supporting platform member 10 with a channel 11 running centrally and longitudinally thereof. The guide members 6 and 7 depending from the base of the container, extend into the channel 11. The wheels 9, 9' have a horizontal dimension which is equal to or slightly less than the width of the channel, the construction being such that lateral movement of the container 5 relative to the supporting platform member 10 is prevented when both guide members 6 and 7 are positioned within the channel, but longitudinal movement of the container 5 relative to the supporting platform member 10 is not hindered by the guide members.

By again referring to Figure 1, it will be seen that the railway vehicle 1 has a container supporting platform member 12 having a cooperating longitudinal channel 13. Near each end of railway vehicle 1, two transversely extending channels 14 and 15 join longitudinal channel 13, one wall of channels 14 and 15 being of a curved configuration as shown.

By reference to Figure 8, it will be noted that platform member 10 is part of a frame unit 300 carried by the frame 301 of trailer 3. The separate unit construction, that is, the construction of a unit which fits onto and is attached to the trailer frame is a preferred embodiment of this invention, however, it is apparent that such construction need not be incorporated, but any other suitable construction which provides proper support may be used whether integral with frame 301 or separate. The frame unit 300 comprises a lower frame 303 which is supported by trailer frame 301, and which is movable with respect thereto when retractable dolly wheels 302 are extended to supporting position. The platform member 10 is disposed above member 303, being coupled thereto by the level mechanisms 76 as best shown in Figure 11. To provide proper support, hydraulically operated auxiliary dolly wheels 302 may be secured to unit 300 so as to depend therefrom. The dolly wheels are incorporated in the preferred embodiment of the apparatus to support unit 300 in particular however, it is apparent that the auxiliary dolly wheels may be secured to the trailer, if the platform supporting structure is integral with the trailer frame or may, if desired, even be secured to the platform.

The separate unit construction facilitates adaptation of standard vehicles to use according to this invention, as such unit may be constructed with the lower frame members 303 having dimensions that allow for easily securing the separate unit to the standard trailer.

The trailer 3 and railway vehicle 1 may be considered as two bases for supporting transportation container 5. As will appear hereinafter when particular reference is made to Figure 12, it is only necessary that there be one mobile base for practice of this invention.

Positioned near an imaginary line running centrally and transversely of railway vehicle 1 are two horizontal pulleys 16 and 17 disposed within longitudinal channel 13. The pulleys rotate on shafts 18 and 19 which are secured to the container supporting platform member 12 or frame thereof in any suitable means such as those referred to with regard to shafts 8 and 8'.

Another horizontal pulley 21 (Figures 1 and 10) is disposed within channel 13, pulley 21 rotating about shaft 22 also secured to supporting platform member 12, or frame thereof, as are pulleys 16 and 17.

The tractor 4 of roadway vehicle 2, as best shown in Figure 3, carries a winch 100. Winch 100 is driven by a pair of cooperating bevel gears 23, one of which is driven by shaft 25 that extends into gear box 26. Shaft 25 is driven by tractor motor 28 through suitable gear connections in the gear box and power linkage 27.

The numeral 29 designates a lever which operates a clutch mechanism (not shown) within gear box 26 for controlling the power connection between motor 28 and shaft 25. The clutch mechanism may be of any suitable design of a well-known type; its only function being to control the transmission of power to winch 100, that is, to connect and disconnect power transmission shaft 25 from a driven power connection.

As best shown in Figure 2, bearing brackets 101 and 102 are disposed at either end of shaft 24, the shaft being thus rotatably mounted. The brackets 101, 102, are secured to the tractor frame by any suitable means such as by bolts 103.

Attached to the winch 100 and to be wound therearound is a cable 30 which passes through a cable guide device 31 carried on trailer 3. The cable guide device 31 comprises a pair of horseshoe brackets 35 and 35' separated by at least two upright shafts 36 and 37. As shown, four upright shafts separate two horseshoe brackets, shafts 38 and 39 being also included in cable guide device 31. A pulley 32 is carried by a shaft 40 extending horizontally between shafts 38 and 39, the shaft 40 having brackets (not shown) at either end suitable for allowing adjustment of vertical position of the shaft 40. A pulley 33 is disposed on shaft 37 and is adjustable with respect to vertical position thereupon by a screw 41' extending through a collar 41. The collar 41 allows for setting the pulley for rotation about the shaft at any desired level. A pulley 34 is disposed on shaft 36 in the same manner that pulley 33 is disposed on shaft 37, collar 42 carrying screw 42' being used to set its position. When in use, vertically disposed pulley 32 and horizontal pulleys 33 and 34 are positioned such that their cable engaging surfaces are properly aligned with channel 11 of the vehicle supporting platform member 10 as will be hereinafter pointed out. Vertical pulley 32 may be used alone when the winch 100 is positioned in longitudinal alignment therewith. Pulleys 33 and 34 are provided so that they may be used either alone or in conjunction with pulley 32 to properly guide cable 30 when the winch is in an angular position relative to vertical pulley 32, that is, in the arrangement shown, when the tractor 4 is not in longitudinal alignment with the trailer 3.

It would be understood, however, that the pulley arrangement is not critical, it only being necessary that a proper pulley guide means is provided. With the arrangement shown, however, the simultaneous use of pulleys 32, 33, and 34 facilitates faultless operation.

The pulley guide device 31 may be carried upon either tractor or trailer, but as shown is carried on the trailer and secured in position by means of bolt 104 extending through a suitably formed aperture in lower bracket 35' and engaging the trailer frame and by means of an angled bracket 105 secured to the top bracket 35 of pulley guide device 31 by a shaft 144 depending from angled bracket 105 and passing into a suitably formed aperture in the top bracket. Angled bracket 105 is secured to the frame of trailer 3 by bolts 106 (Figure 2).

As best shown in Figure 8, a pulley 44 is carried at the rear end of and near the bottom of channel 11. This pulley is disposed on a shaft 45 which is supported in position by bearing brackets 46. Brackets 46 are secured to the frame of supporting platform member 10 in any suitable manner, such as by welding them thereon.

By referring again to Figure 1, it will be seen that two projections 145, in the form of tapering cylinders secured to the frame of vehicle platform member, extend outwardly beyond the rear end of trailer 3. The projections extend into apertures 146 in the frame of railway vehicle 1, the apertures being of slightly greater diameter than the projections allowing for some deviation in alignment. The projections 145 and apertures 146 cooperatively serve as a means for determining proper alignment of the trailer in perpendicular juxtaposition to the railway vehicle 1 where it is desired to make a transfer of the container from roadway to railway vehicle or vice versa.

To the shaft 8, best shown in Figure 5, is attached a cable 47, having a connector or hook 48 which is attached to an eye 49 secured to the rear of container 5, and to the shaft 8' is attached a cable 50 having a connector or hook 51 which is attached to an eye 52 secured to the front of container 5.

By referring to Figures 1, 9 and 10, it will be seen that along the curved walls of transverse channels 14 and 15 are disposed a series of pulley-roller devices 53. Each device comprises a shaft 54 rotatably mounted within supporting frame member 12 and on which is mounted a roller 55 near the top of the channel and a pulley 56 near the bottom of the channel. The rollers 55 are vertically aligned with respect to the bottom of the channel such that they will cooperate with rollers 9 and 9' during a transfer of the container 5 from one vehicle to another as will be explained in more detail hereinafter. The pulleys 56 near the bottom of the channel are positioned vertically such that they guide a cable 47 which passes over pulley 44 and connects with cable 30 attached to winch 100.

By reference to Figures 3, 8 and 10, it will be noted that on the bottoms of shafts 8 and 8' pulleys 57 are rotatably mounted on shafts 58 that extend through rectangular openings through the bottom of shafts 8 and 8' in longitudinal alignment with channel 11. The pulleys 57 aid in guiding a cable extending between pulley 44 and cable guide device 31, and are vertically positioned such that they may aid in guiding a cable so disposed.

By again referring to Figure 1, it will be seen that two shafts 59 and 60 are journaled within the frame of railway vehicle 1, and two shafts 61 and 62 are journaled within supporting platform 10.

Shafts 59 and 62 carry locking members 63, and shafts 60 and 61 carry stop members 64 and 66. Figure 15 presents the details of construction of the locking and stop members. The numeral 65 designates the base or floor member of a container, and the numeral 165 designates a rectangular aperture extending through the base. Passing horizontally from one side of aperture 165 to the other is a shaft 67 which may be secured in place by any suitable means such as a weld. The container floor 65, as shown in Figure 15, is disposed on railway vehicle 1. Fixedly secured to shaft 59 is a hook member 63 which may be rotated in position to surround shaft 67. When rotated to such position, the container having a floor 65 would be held against movement relative to supporting platform member 12.

At the front of container floor member 65 is a rectangular depression 66'. The depression 66' has dimensions which are slightly greater than the outer dimensions of stop member 66. The shaft 60 carries a cam 68 fixedly secured thereto. The cam member 68 causes stop member 66 to move upwardly into the position shown upon rotation of shaft 60. As is apparent, depression 66' is disposed to cooperate with stop member 66. It should thus be apparent that stop member 66 and locking members 63 serve to fasten a container in place when shafts 59 and 60 are properly rotated, and that the stop and locking members may be moved out of position when a fastening is not desired. As shown in Figure 1, a handle 110 is used to rotate the shafts. The handle is detachable so that it may be carried off of the shaft, thus preventing unauthorized persons from operating the fastening means. It should be understood that the shafts 61 and 62 carrying stop members 64 and locking members 63 operate in the same manner as shafts 60 and 59.

In order that the container may be readily moved from vehicle to vehicle, or platform to vehicle, or vice versa, means are provided for reducing the friction. By reference to Figure 11, it will be seen that ball bearings 69 are mounted in socket frames 70, the frames being attached by any suitable means such as weld, to the bottom of container 5 at spaced intervals. To facilitate the positioning of the container 5 on the roadway or railway vehicle, depressions 71 are provided in the surfaces of the platform members of both vehicles. As best seen in Figure 1, those depressions have a double pear-shaped horizontal outline and, as best seen in Figure 11, have two surfaces which gradually slope away from each other and terminate in a central depression.

From the foregoing description, it will be apparent that the vehicle platform members should be in horizontal alignment during operation of the apparatus to effect a transfer. In order to insure that such alignment may be maintained, level adjusting mechanisms, such as that designated by the numeral 72 in Figure 11, are provided. The level mechanisms serve to raise or lower the roadway vehicle container supporting platform 10. They comprise an arm 73, pivotally secured to the platform member as at 74 and to the frame unit 300 as at 75. Rams 80 having a cylinder 76 and piston rod 79 are also included within the level mechanisms. The piston rod 79 is pivotally secured to the frame unit 300 as at 78 while the cylinder is pivotally secured to the platform member 10 as at 77. Hoses 81 and 82 extend from the cylinder to a suitable fluid supply (not shown). As best shown in Figure 3, three level mechanisms are disposed on either side of an imaginary line running centrally and longitudinally of the trailer 3, however, any suitable number of level mechanisms may be used, and the hydraulic means incorporated therein may be of any suitable type. Moreover, it should be understood that any suitable level adjusting mechanism other than the type particularly disclosed herein may be used.

By referring to Figures 3, 10 and 12, it will be apparent that the apparatus may include movable dollies 83 which are movable through the container 5. The dollies have a base or supporting member 84 from which depends axle supports 85. An axle 86 is journaled within the supports and carries wheels 87. The dollies may be of any conventional design, no novelty of the basic structure being a part of the instant invention. However, according to the invention, the dollies should carry a coupling arrangement such as that designated by the numeral 86'. As shown, particularly in Figure 10, the coupling arrangement comprises a latch member 87' and cooperating fastening member 88'.

As best shown in Figure 12, the inside floor of container 5 has guideways 89 and 90 therein, the guideways being in the form of longitudinal grooves which are spaced so as to receive wheels 87 of the dollies, and thus guide movement of the dollies within the container.

By again referring to Figure 3, it will be noted that a bulkhead 190 in the form of a false wall is movable through the container. The bulkhead is supported in position by shafts 91' extending from either side thereof, each shaft carrying a wheel 91 which is rotatable within one of the longitudinal guideways 92 disposed in the side walls of container 5. Centrally disposed along the upper and lower edges of the bulkhead are spaced pulley means 93 and 96 attached to the bulkhead in any suitable manner such as by a weld. A cable 94, attached to the top of the container as at 95 extends forwardly through the container over the pulleys of pulley means 93, down through the container and over the pulley of pulley means 96, and then rearwardly of the container and over pulley 97. The cable 94 itself may be extended or it may be attached to a cable which extends over pulley 44 disposed at the rear of the trailer frame and then forwardly and under the trailer frame to a pulley 401 which is disposed at the forward end of the trailer frame slightly behind pulley 32. The cable so extended would then pass through cable guide device 31 and on to winch 100. Thus, upon rotating winch 100 in a clockwise direction, the bulkhead would be caused by cable 94 itself, or by cable 94 and another cable or cables connected thereto, to move rearwardly thus pushing dollies 83 and any articles they carried out of the containers and, of course, onto an unloading station.

By particular reference to Figure 3, it will be noted that retractable wheels 302 are provided and attached to the trailer frame, or the frame of platform 10, the wheels being operated hydraulically and serve to provide support when desired.

In Figure 2 a shaft 151 carrying a pulley 154 is shown to be disposed above winch 100. The shaft is secured in position at either end by bearing brackets 152 and 153, the brackets being attached to the gear box or tractor frame as shown in Figure 3, by any suitable means. The pulley 154 is in vertical alignment with an opening 155 in the front of container 5. A cable 158, as shown best in Figure 4, is carried on the floor of container 5 or in a central groove therein. It extends under the bulkhead and over suitable pulleys if desired, through aperture 155 in the front of the container, and to an eye 160 on the front of the container to which a connector 161 at one end of the cable attaches. This connector may be attached to cable 30 to pull the same rearwardly of the container when it was desired to use cable 30 to pull dollies into the container. If cable 158 remained attached to cable 30 during such movement, then it would be returned to its carrying position.

*Operation*

The disposition of the various components of the invention, as well as the construction thereof, has been set forth above, and attention will now be directed to operation of the apparatus.

Assuming that the mobile transportation container 5 is secured in position on the trailer 3 which is powered by tractor 4, and that articles to be transported are loaded on dollies awaiting shipment, the operation would be as follows:

The trailer would be backed up to a shipping platform, the rear door would be opened, and cable 30 would be extended through the truck by means of cable 158 as above set forth and attached to a dolly 83. If more than one dolly were to be loaded, the dollies would be coupled together and the cable 30 attached to the front dolly. The pulleys 32, 33 and 34 or any combination thereof desired, would be adjusted so as to be in alignment with aperture 155, and cable 30 would be extended through or attached to a cable extending through pulley guide device 31 and on to winch 100. The clutch lever 29 would then be positioned such that the winch is powered in a clockwise direction, and the dollies would be pulled into the container to desired position, being guided by guideways 89 and 90. The clutch would then be disengaged. If necessary, this operation would be repeated until the container housed as many dollies as it was desired to transport.

After being loaded with dollies, the cable 158 could be disconnected from the cable 30 whenever it was desired to use cable 30 to move container 5. After loading, the trailer would then be moved to a railway loading location, and, if necessary, the container supporting platform 10 would be raised by means of the level mechanism 72 so that the surface of the roadway vehicle container supporting platform was substantially in horizontal alignment with the railway vehicle container supporting platform 12. The trailer would then be backed into perpendicular juxtaposition with the railway vehicle, extensions 145 and associated apertures 146 being used to aid in proper alignment.

Cable 30, which is shown in Figure 3 as attached to winch 100, extends rearwardly of the tractor 4 in channel 11, passing through cable guide device 31 and over pulley 44, the cable being carried if desired within the channel when not in use.

Cable 30, during a transfer of container 5 from roadway to railway vehicle, would be extended so as to pass around pulley 21 and pulley 16 and would then be attached to cable 47. Cable 47, as pointed out hereinabove, is attached to shaft 8', depending from the bottom of the container.

After cable 30 is so disposed and attached to cable 47, the clutch lever would be positioned such that winch 100 rotates clockwise, and as a result, container 5 would be pulled onto the railway vehicle, its movement being guided by channels 11, 13 and 14 as shown.

Of course, it should be understood that shafts 61 and 62 were rotated so as to unfasten the container from the trailer prior to movement, and that shaft 60 was rotated such that stop members 66 are in raised position ready to engage and stop the container when in proper position on container supporting platform 12.

After the container was on the railway vehicle, cable 30, or separable parts thereof, would be disengaged from cable 47, and the cable or parts thereof would be returned to the carrying position on the trailer. Shaft 59 would be rotated such that locking members 63 cooperate with shafts 67 to secure the container in place.

When the railway vehicle reached its destination, the container would be unloaded by attaching cable 50 to cable 30, cable 50 being secured at one end to shaft 8' depending from the bottom of container 5. The operation for unloading would be essentially the same as that for loading, the only difference being that cable 30 would not extend around pulleys 16 and 21, but would be, at least during part of the transfer, in engagement with pulleys 56 disposed along the curved wall of channel 14.

In Figure 13, the disposition of cable 30 is shown when a transfer is to be made between two railway vehicles. It will be noted that an auxiliary connecting guideway 200 is used in this case, guideway 200 joining channels 13 of adjacent railway vehicles.

When it is desired to unload the dollies from the container, the bulkhead may be used in accordance with the description set forth hereinabove with relation thereto, cable 94 or cable 94 together witth extensions thereof, being wound upon winch 100 to effect rearward movement of the bulkhead. Of course, container 5 may be unloaded in accordance with the apparatus shown in Figure 12, which embodies a ramp 201 and pulley 202. Cable 30 would be in this instance passed around pulley 202 and then attached to the rearmost dolly in the container, and, of course, the winch 100 would be rotated to effect unloading.

In this instance, cable 30 would be extended from the winch and around pulley 202 located on the loading dock and attached to the front dolly before unloading the dollies. The operation of the apparatus shown in Figure 12 is preferred whenever a suitable pulley means is disposed on a loading platform to be used. If no pulley means is disposed on the loading dock to be used, then cable 30 may be extended through channel 11, as above set forth, or it can be extended around pulley 401 rearwardly under the truck and over pulleys 400, 44, 400' and 401 and attach to the cable 94 extending from the bulkhead 190 so that when winch 100 is powered, bulkhead 190 is caused to move rearwardly.

*Modification*

In Figure 14 a modification of this invention is presented which modification incorporates a turntable 250 disposed on a railway vehicle 251. The platform surface 252 of the railway vehicle has guideways 253 and 254 disposed therein. Guideway 253 is circular and centrally disposed on platform surface 252, while guideways 254 are arcuate and disposed near either end of the platform surface.

The turntable 250 comprises, as shown, two elongated side frame members, 255 and 256, separated by two end frame members 257 and 258. The members are joined by any suitable means, such as by welding or corner brackets or both, so as to define a rectangular frame. Centrally disposed within the rectangular frame, is another frame generally designated by numeral 259. This central frame is adapted to support means for pivotal connection with the railway vehicle frame as at 260.

A series of ball bearings 261 are carried in socket frames attached, by any suitable means to the central frame 259. These ball bearings 261 are disposed so as to cooperate with guideway 253. At least at the corners of turntable 250, ball bearings 262 are carried, these ball bearings being disposed so as to cooperate with guideways 254. It should be understood that any rotatable supporting means may be used, and the invention is not limited to the use of ball bearings.

The turntable 250 could have a channel disposed centrally and longitudinally of a platform carried by it, and thus be used in accordance with the roadway vehicle of the preferred embodiment of this invention, however, in the preferred embodiment of this modification, the turntable carries two longitudinal guideways 263 and 264. In accordance with this preferred embodiment, a wheeled container would be used, the wheels being disposed so as to cooperate with the guideways, or the guideways being disposed so as to cooperate with the wheels.

When effecting a transfer with the turntable arrangement shown in Figure 14, the turntable would be rotated to the dotted line position, and a trailer would be positioned in longitudinal alignment therewith, as shown in phantom. A tractor carrying a winch, such as that used in the preferred embodiment of this invention may be used together with an appropriate system of pulleys to supply the motive power needed. Of course, means for securing the various components of the modification in proper position, such as those used with the preferred embodiment of the invention, should be incorporated in this modification.

In the modification shown in Figure 16 the loading and unloading apparatus or assembly is associated with the rear of a highway trailer 425 and a flat car 426, and with the vehicles positioned substantially end to end relative to each other. The trailer 425 is suitably connected to a tractor in substantially the same manner as the trailer 3 previously described. A transportation container 428 is shown in dotted lines mounted on the floor of the trailer and the floor of the flat car and in full lines in the position it assumes when being transferred from the trailer to the flat car 426. Longitudinally spaced guide members 429 and 430 extend downwardly and centrally from the underside of the container 428 (Fig. 17), and each includes a vertical shaft 431 that rotatably carries a roller 432 arranged to extend into the longitudinal and centrally disposed channel 433 in the floor or bottom of the trailer 425 and also into the longitudinal and centrally disposed channel 434 in the bottom or floor of flat car 426, so as to frictionally engage the side walls of the channels when the container is being transferred from one vehicle to another. The floor or bottom of the trailer 425 is also formed with branch or lateral channels 435 arranged in pairs and which extend outwardly from opposite sides of the longitudinal channel 433 and communicate therewith adjacent its opposite ends. The side walls of the branch channels 435 are connected with the adjacent walls of the channels 433 by confronting curved portions 436. Mounted in each of the spaces 436', formed at the juncture of the channels 433 with the branch channels 435, is a centrally disposed pulley 437. The rear end of the trailer carries a pulley 438 in alignment with the longitudinal channel 433 and may be suitably supported by a transverse bracket 439. Opposite ends of the trailer 425 have vertical pulleys 440 and 441 positioned in the channel 433 and substantially in alignment with each other. A self-contained winch 442 mounted on the tractor 427 carries a pulling cable 443 movable in the channel 433.

A plurality of guide pulleys 444 are positioned on opposite sides of the channels 433 and 435 where they intersect so as to be engageable by the cable 443 when transferring the container 428 from one vehicle to another. The depending guide member 429 has a short cable 464 extending outwardly therefrom in the channel 433 and also into channel 435, and the depending guide member 430 also has a short cable 464' extending into the channel 433, so that either of the short cables 464 or 464' may be selectively connected to an adjacent end of cable 443 (Fig. 19) when it is desired to transfer the container from one vehicle to another. The cable or pulling medium 443, as it issues from the winch 442, may be conducted by a lead line, not shown, so as to pass through pulley 440 and longitudinally spaced pulleys 437, so that its free end extends into the end of the branch channel 435, where it can be used for either loading or unloading conveniently detachably connected to the cable 464.

Associated with each of the spaces 436' (Fig. 20) is a movable guide member 450, which may be in the form of a retractable bar or rod that is slideable, in an inclined recess 450' in one side of the trailer, and which extends across the space 436' so as to fit into an aligned recess 451' in the opposite side of the vehicle, so as to constitute an extension of the side of a branch channel 435 in order to guide the container and the spaced depending members 429 and 430 in the channels when transferring the container from the trailer to the flat car.

The flat car 426 may be of such a length as to carry two containers 428, and has the longitudinal and centrally disposed channel 434 and branch channels 451 on opposite sides of and communicating with the longitudinal channel 434 so as to receive and control the direction of movement of the depending guide members 429 and 430 during the transferring operation. Positioned in the channel 434 is a pulley 452 corresponding to the pulleys 437, previously described, and also a centrally disposed pulley 453. Each of the pulleys 452 is located in a space 454 formed by the juncture of the longitudinal channel 434 with a branch channel 451 (Fig. 19). Opposite ends of the flat car 426 have pulleys 455 and 456 which align with channel 434. A plurality of spaced guide pulleys 457 are disposed on opposite sides of the channels 434 and 451 at the juncture thereof with each other so as to function similar to the guide pulleys 444 on the trailer. A retractable guide bar 458 (Fig. 20) is slideable in a recess 459' in one side of the car 426 so as to extend across the space 454 and fit within an aligned recess 458' in order to serve as a guide for a depending member, such as 429 or 430 on the container, when transferring the latter from one vehicle to another. Additionally, auxiliary guide means in the form of a pair of spaced bars or rods 470 are arranged to be positioned in the space between the trailer 425 and the flat car 426 so as to provide a bridge between the vehicles for guiding the depending members 429 and 430 on the container when the latter is being moved from one vehicle to the other.

Each of the guide members 470 is slideable in an elongated recess 470' on the car 426 so as to extend across the space between the car and the trailer and fit within an aligned recess 471 on the trailer (Fig. 20). Thus means are provided on opposite sides of the channels for insuring the smooth loading or unloading of either vehicle. Each of the cars 426 also carries tops 459 connected to a transverse shaft 460 and locking members 461 connected to a transverse shaft 462, so that, when the container is mounted on the car 426, it will be maintained firmly in a fixed position. The locking members and stops may be controlled or operated by a detachable handle 463 (Fig. 16). The pulling cable 443 is previously positioned to pass through pulleys 440 and 437 by a suitable lead line, so that the outer end of the cable extends into a branch channel. Likewise, each of the short cables 464 and 464', attached to the depending members 429 and 430, has previously been trailed into a channel 435 so as to be conveniently positioned to detachably connect the free end thereof to the cable 443 in order to transfer the container from one vehicle to another.

In operation assuming the trailer 425 and flat car 426 are arranged side by side and substantially parallel to each other with the flat car and the rear of the trailer disposed approximately end to end, as shown in Figure 16, and the container secured to the trailer by the members 446 and 448, if it is desired to transfer the container 428 on the trailer to the car 426, the cable 443, as it fed from the winch 442, passes over the pulley 440, spaced pulleys 437 into branch channel 435 around pulleys 452 in the center of the space 454 on the car 426 down the channel 434 around the pulley 453, and then returns through the channel 434 over the pulleys 457 and into the branch channel 451, where it is connected to the free end of the short cable 464' as at 465 on the depending member 430. The retractable guides 450 and 470 have previously been moved to their extended positions so as to provide means for guiding the depending members 429 or 430 from one channel to another and across the space between the vehicles. Operation of the winch 442 then causes the cable 443 to move the container from the trailer to the flat car where it is maintained in a fixed position by the members 459 and 461.

On the other hand, when it is desired to transfer the container on the flat car 426 to the trailer 425, it is only necessary to attach the short cable 464 on the depending member 429 to the outer end of the cable 443, which is now positioned in the branch channel 435, so that upon rotation of the winch 442 the container 428 will be transferred in a direct pull from the car to the trailer.

It will be observed that the vehicles are so associated that the container may be taken off the trailer either at the rear or front thereof, so that a flat car may be approached from either direction or either side and still place the container on either end of the flat car. In the form shown in Figure 19, in which the trailer is positioned adjacent and substantially parallel to each flat car, the arrangement prevents interference with other flat cars and makes it possible to load or unload a complete train of flat cars simultaneously.

Instead of the ball bearing means 69 and their associated parts, as shown in Figure 11, for reducing friction between the container 428 and the roadway or railway vehicle, there may be provided between the bottom of the container 428 and a false bottom 600 a longitudinally extending space or recess 601 into which extends an inflatable air tube 602 connected to an air inlet valve 603 and an outlet valve 604 for controlling the flow of the air under pressure into and out of the tube 602. A vertically displaceable member or plate 605 is positioned within the space 601 below and in contact with the tube 602. Below the plate 605 is a perforated plate or member 606 having spaced openings 607 aligning with complementary opening 608 in the false bottom 600 of the container. Loosely mounted in each of the openings 607 is a ball bearing or roller 609 which is arranged to extend downwardly and outwardly of the opening 608 so as to engage the floor 610 of the vehicle.

Each of the rollers 609 is arranged frictionally to engage the upper surface of a roadway or railway vehicle 606. As shown, air under pressure has been introduced into the tube 602 thus forcing the plate 605 downwardly so as to move the rollers 609 in tight frictional engagement with the adjacent surface of the vehicle 610 so as to prevent displacement of the container relative to the vehicle. Conversely, when the air pressure is cut off from the tube 602 and allowed to escape through opening of the valve 604, each of the rollers 609 and the plate 605 are moved upwardly so that the rollers 609 will loosely engage the top of the vehicle 610. Thus fluid control means are provided for insuring the container being firmly maintained in a fixed position relative to the vehicle or for releasing this frictional engagement so that the container may be moved relative to the vehicle.

In Figure 19 the trailer 425 is positioned relative to the car 426 adjacent the transverse center line of the car, and pulling cable 443 is connected through the instrumentality of the short cable 464 or 464' with a depending member 429 or 430 on the container in substantially the same manner as previously described. In order to load and unload at the front of the trailer, assuming it is desired to unload the container from the trailer, cable 443 is passed over pulleys 440 and 437 into channels 435 and 451 around pulley 452 then down channel 434 to pulley 453 where it is returned to channel 434 over pulley 457 and is connected to short cable 464 so that upon operation of the winch 442 the container will be transferred from the trailer to the flat car. Conversely, to unload the container from the flat car, cable 443 extends down the channel 433 passing through space pulleys 437 and then over pulley 438 where it returns to channel 433 and then into channel 435 over a plurality of adjacent pulleys 444 so as to be connected to the short cable 464'. It will be seen that when loading and unloading the railway flat car or highway trailer may be easily accomplished when both the flat car and highway trailer are side by side and substantially parallel to each other. Further, the guide bars 450, 458 and 470 provide extensions for guiding the depending members on the container through the longitudinal and branch channels so as to insure the smooth and efficient transfer of the container from one vehicle to another.

Thus it will be seen that simple, efficient and positive means are provided for loading or unloading a flat car and the rear of a highway trailer, and for unloading a flat car from the front or rear of a trailer to either half of a flat car, when arranged substantially end to end from either end of a flat car, so as to provide six points on the flat car and five points on the trailer for loading and unloading the container. Moreover, the trailer may be located on either side of the flat car and adjacent the center line of the latter so as to transfer the container from one vehicle to another. Thus the loading and unloading may be accomplished in a narrow or restricted place which ordinarily would not permit right-angle loading.

*Conclusion*

From a consideration of the foregoing description and accompanying drawings, it will be apparent that there is provided by this invention apparatus by which the various phases, objects, and advantages hereinabove set forth are successfully achieved.

Modifications of this invention not described herein will become apparent to those of ordinary skill in the art after reading this disclosure.

For example, it will be evident that a standard single unit roadway vehicle may be used instead of the tractor-trailer arrangement described above.

Since various modifications may be made without departing from the scope of the invention, it is intended that the matter contained in the foregoing description and the accompanying drawings be interpreted as illustrative and not in a limiting sense when consideration is given to the amended claims.

What is claimed is:

1. Apparatus for transporting articles comprising, in combination, a mobile transportation container for housing said articles, guide members depending from the bottom of said container, a first base for supporting said transportation container, a second and mobile base for supporting and transporting said transportation container, first channeled guide means adapted to receive said guide members and on said first base for guiding movement of said transportation container simultaneously transversely and laterally of said bases during a transfer of said container from one of said bases to the other when said bases are disposed substantially perpendicular to and adjacent one another, second channeled guide means adapted to receive said guide members and on said second base for cooperating with said first guide means for guiding said transportation container in conjunction with said first guide means, at least one of said bases having a vertically and longitudinally adjustable frame container supporting platform member carrying said first guide means, and power means for causing movement of said transportation container from one of said bases to the other.

2. Apparatus for transporting articles comprising, in combination, a mobile transportation container for housing said articles, guiding members depending from the bottom of said container, a first base for supporting said transportation container, first guide means comprising a first elongated channel adapted to receive said guiding members and carried on said first base, a second and mobile base for supporting and transporting said transportation container, second guide means carried on said second base and comprising a second elongated channel and at least one transverse channel curving into and joining said second elongated channel adapted to receive said guiding members, said first and second guide means being adapted to cooperate with each other to guide said container longitudinally and laterally of said bases during a transfer of said container from one of said bases to the other, cable means having one end coupled to said container, power means carried on one of said bases and engaging the other end of said cable means for powering said container, and means for guiding said cable means within said channels during a transfer of said container from one of said bases to the other.

3. Apparatus for transporting articles comprising the combination as defined in claim 2 wherein said second guide means includes at least two transversely extending channels which curve into and join said second elongated channel on opposite sides of said elongated channel intermediate the center of said elongated channel and one end thereof.

4. Apparatus for transporting articles comprising, in combination, a mobile transportation container for housing said articles, guiding members disposed to depend from the bottom of said container, a first base for supporting said transportation container, first guide means comprising a first elongated channel adapted to receive said guiding members and carried on said first base, a second base for supporting said transportation container, second guide means carried on said second base and comprising a second elongated channel and at least one branch channel extending transversely of, and opening into, said second elongated channel, said second elongated channel and said branch channel being adapted to receive said guiding members, one of said bases being mobile, said first and second guide means being adapted to cooperate with each other to guide said container simultaneously longitudinally and laterally of said bases during a transfer of said container from one of said bases to the other, pulling means adapted to be coupled to said container, and means for guiding said pulling means within said channels during a transfer of said container from one of said bases to the other.

5. Apparatus for transporting articles as defined in claim 4 wherein said first and second elongated channels extend at least to one end of said first and second bases respectively whereby said container can also be transferred longitudinally of said bases when said bases are disposed end to end and said elongated channels are aligned.

6. Apparatus for transporting articles comprising the combination defined in claim 4 wherein said second guide means includes at least two transversely extending branch channels which slope into and join said second elongated channel on opposite sides of said second elongated channel intermediate the center and one end thereof.

7. Apparatus for transporting articles as defined in claim 6 wherein the longitudinal axes of said branch channels are disposed at acute angles with respect to the longitudinal axis of said second elongated channel.

8. Apparatus for transporting articles as defined in claim 4 wherein said pulling means is a cable means and wherein said means for guiding said pulling means within said channels comprises a plurality of guide wheels disposed within said channels and cooperating with said cable means for guiding said cable means, said guide wheels being disposed below the path traversed by said depending guide members.

9. Apparatus for transporting articles as defined in claim 4 wherein said container has bulkhead means longitudinally movable therein, and means operatively connecting said bulkhead means to said pulling means for moving the contents of the container therefrom.

10. Apparatus for transporting articles as defined in claim 4 wherein at least one of said base is provided with vertically and longitudinally adjustable platform means for supporting said container, and means for raising and lowering said platform means, and wherein said platform means carries the guide means disposed on said one base.

11. Apparatus for transporting articles as defined in claim 10 and further including winch means carried on said one base, wherein said pulling means comprises cable means adapted to be operatively connected to said winch means and said container for pulling said container between bases upon operation of the winch means, and wherein said apparatus also includes a cable guide device for directing said cable means from a channel on said platform means to said winch means regardless of the level or angle at which said cable means approaches said winch means.

12. Apparatus for transporting articles as defined in claim 4 and further including winch means carried on one of said bases, wherein said pulling means comprises cable means operatively connected to said winch means and said container for transferring said container between bases upon operation of the winch means, and wherein said apparatus also includes a cable guide device for directing said cable means from a channel onto said winch means.

13. Apparatus for transporting articles as defined in claim 4 wherein said container has at least one opening in the bottom thereof, a fluid pressure housing connected to the container above said opening and registering with the same, a ball bearing loosely mounted within said opening and arranged to engage said bases when the container is mounted thereon, said housing having a reciprocating plate therein engageable with said ball bearing, and means when fluid pressure is introduced into said housing for moving said plate so as to press the ball bearing into tight frictional engagement with the base so as to prevent displacement of the container relative to the vehicle, and said ball bearing when the fluid pressure is released being displaceable within said housing so as to be moved out of tight frictional engagement with the base.

14. Apparatus for transporting articles comprising the combination defined in claim 4 wherein said second base comprises a railway vehicle, and said first base comprises a roadway vehicle.

15. Apparatus for transporting articles comprising the combination defined in claim 4 and further including mobile article supporting dollies adapted to be moved within said transportation container, and having rolling supports, wherein said transportation container has guideways in the base thereof which receive the rolling supports of said dollies to guide movement of said dollies within said container.

16. Apparatus for transporting articles as defined in claim 15 wherein said container has bulkhead means longitudinally movable therein, and means operatively connecting said bulkhead means to said pulling means for moving said dollies of the container therefrom.

References Cited in the file of this patent

UNITED STATES PATENTS

| | | |
|---|---|---|
| 746,737 | Olson et al. | Dec. 15, 1903 |
| 1,751,717 | Romine | Mar. 25, 1930 |
| 1,883,538 | Bywater | Oct. 18, 1932 |
| 1,937,062 | Kellett | Nov. 28, 1933 |
| 1,993,481 | Kellett | Mar. 5, 1935 |
| 2,123,424 | Kellett | July 12, 1938 |
| 2,127,480 | Fitch | Aug. 16, 1938 |
| 2,543,295 | McGregor et al. | Feb. 27, 1951 |
| 2,591,153 | Hodges | Apr. 1, 1952 |
| 2,820,560 | Davis | Jan. 21, 1958 |
| 2,856,085 | Ryan | Oct. 14, 1958 |